Oct. 17, 1967  J. A. HAIDINYAK  3,347,179

PIE AND PASTRY BOARD

Filed March 2, 1966

INVENTOR.

John A. Haidinyak ited States Patent Office 3,347,179
Patented Oct. 17, 1967

1

3,347,179
PIE AND PASTRY BOARD
John A. Haidinyak, 3755 W. 69th Place,
Chicago, Ill. 60629
Filed Mar. 2, 1966, Ser. No. 531,121
3 Claims. (Cl. 107—46)

This invention relates to measured cutting boards, and more particularly a pie and pastry board.

It is therefore the main purpose of this invention to provide a pie and pastry board having a plurality of grooved lines for cutting pastries into uniform slices.

Another object of this invention is to provide a pie and pastry board having a pair of circular grooves for measuring dough for pies.

Another object of this invention is to provide a pie and pastry board which is preferably made of wood and may be provided in different sizes.

Still another object of this invention is to provide a pie and pastry board which is inexpensive to manufacture, and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
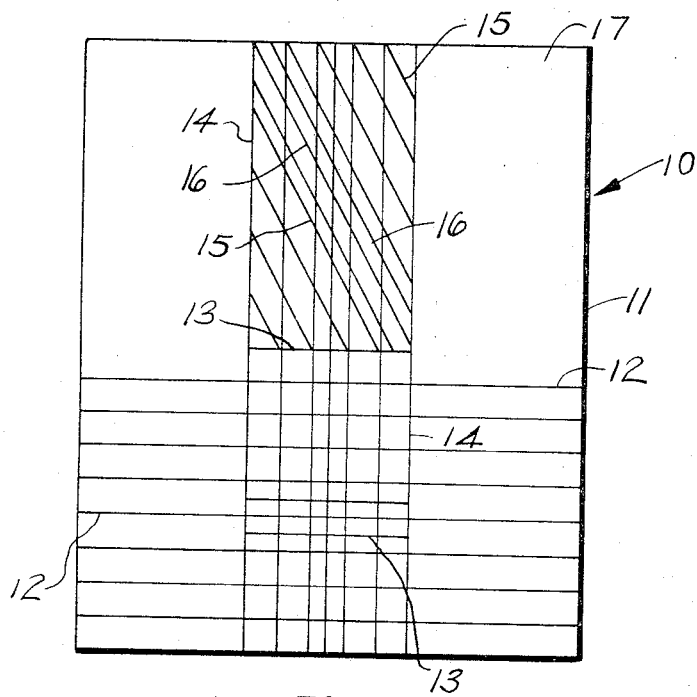
FIGURE 1 is a top plan view of this invention.
Figure 2:
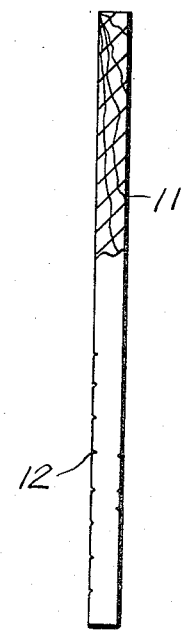
FIGURE 2 is a side view of FIGURE 1 shown partly broken away.

According to this invention, a pie and pastry board 10 is provided with a rectangular plate 11 which is preferably made of wood. Front side 17 of plate 11 is provided with a plurality of transversely disposed lines 12, which cover approximately one half of plate 11 and extend from one side of said plate to another. Furthermore lines 12 are spaced from each other in a uniform relationship. Front side 17 of the plate 11 is also provided with a number of longitudinally disposed grooved lines 14 which extend from one end of plate 11 to the other. Lines 14 are positioned in substantially center portion of said said plate. It should be noted that lines 12 and 14 comprise substantially identical grooves for providing uniform depth for the cutting knife (not shown). As shown in FIGURE 1, a number of grooved lines 13 are also present on plate 11 and said lines are transversely disposed on said plate and terminate at the end lines 14. FIGURE 1 also shows a plurality of diagonally disposed lines 15 and 16 which have a non-uniform spacing and intersect the longitudinal lines 14. Like the groved lines 12, 13 and 14, the diagonal lines 15 and 16 are of substantially identical grooved depth.

2

The above mentioned elongated grooves can be effectively used for cutting pastries or meat into uniform pieces.

Figure 3:
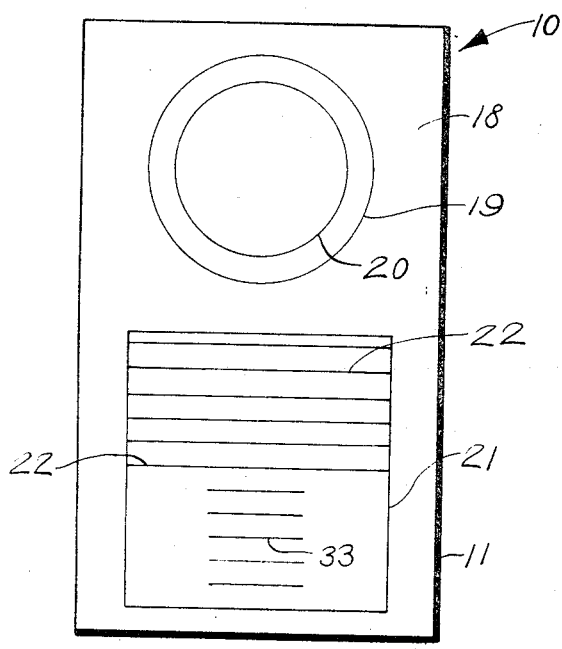
FIGURE 3 is a bottom plan view of FIGURE 1.
Figure 4:
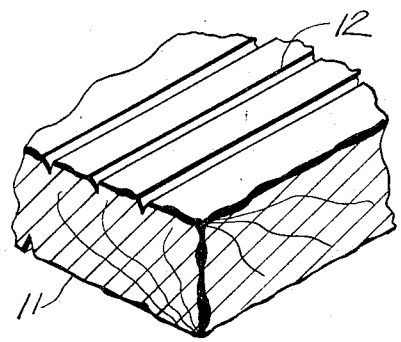
FIGURE 4 is an enlarged fragmentary perspective view of the invention.

Looking now at FIGURE 3, of the drawing, one will see that the back side 18 of plate 11 is provided with an outer circle 19 and an inner circle 20 which are uniformly spaced from each other and are provided with grooves which are of substantially identical depth as those shown on the front side 17 of plate 11. In addition, a rectangular grooved line 21 is provided on the same side as the circular lines 19 and 20. One half of the rectangular line 21 is uniformly divided by transversely disposed grooved lines 22, which extend to both sides of lines 21. A plurality of lines 33 which are uniformly spaced from each other are centered within the other half of rectangular line 21 and uniformly terminate near the center portion thereof.

It will also be noted that backside 18 is adapted for measuring the dough for pies and other food stuffs.

What I now claim is:

1. Pie and pastry board comprising, in combination, a rectangular board, the front side of said board provided with a plurality of straight-line grooves transversely positioned on said board, said grooves are uniformly spaced from each other and extend to the sides of said board, a plurality of longitudinally disposed straight-line grooves adapted to form a perpendicular relationship with said transversely extending grooves, said longitudinally extending grooves terminate at the ends of said board and are positioned near the center portion thereof, a number of transverse groups terminating at the end lines of said longitudinal grooves, a plurality of diagonally spaced grooves intersecting said longitudinal grooves in a non-uniform relationship to each other, the backside of said board is provided with a first circularly disposed groove, a second circular groove of a greater diameter than said first groove is adapted to uniformly enclose said first groove and be uniformily spaced therefrom, a straight-line groove assuming square relationship, a plurality of transverse grooves abutting the longitudinal lines of said squarely disposed groove, a plurality of transverse grooves centrally positioned within said squarely disposed groove and said all straight-lines and circular grooves are adapted to admit a sharp-edge too therein.

2. The board according to claim 1, wherein said board is made of wood.

3. The board according to claim 1, wherein each of said grooves assume a V-shaped configuration.

References Cited

UNITED STATES PATENTS 1,214,785   2/1917   Hill _____ 33—1
3,299,835   1/1967   Marsili _____ 107—47

OTHER REFERENCES

Popular Mechanics, January 1953, page 142 relied on.

WALTER A. SCHEEL, Primary Examiner.

J. SHEA, Assistant Examiner.